United States Patent [19]

Hoffman et al.

[11] 4,218,605

[45] Aug. 19, 1980

[54] AIR-CARBON ARC CUTTING AND GOUGING TORCH

[75] Inventors: Stephen A. Hoffman; Jerry R. Hummel, both of Lancaster, Ohio

[73] Assignee: Arcair Company, Lancaster, Ohio

[21] Appl. No.: 25,319

[22] Filed: Mar. 30, 1979

[51] Int. Cl.² .............................................. B23K 9/00
[52] U.S. Cl. ................................................ 219/70
[58] Field of Search ........................................ 219/70

[56] References Cited

U.S. PATENT DOCUMENTS

| | | | |
|---|---|---|---|
| 2,706,236 | 4/1955 | Stepath | 219/70 |
| 2,726,309 | 12/1955 | Stepath | 219/70 |
| 3,234,317 | 2/1966 | Henderson | |
| 4,161,642 | 7/1979 | Arnason | 219/70 |

*Primary Examiner*—E. A. Goldberg
*Attorney, Agent, or Firm*—James C. Simmons; E. Eugene Innis

[57] ABSTRACT

A fixed head air-carbon arc cutting and gouging torch for use in a metal foundry for cleaning riser pads, sprues, fins and other excess or unwanted surface material or defects from castings. The torch is characterized by improved air flow means to reduce the required inlet air pressure, improved air valve means, better head angle and handle design for increased process efficiency.

6 Claims, 2 Drawing Figures

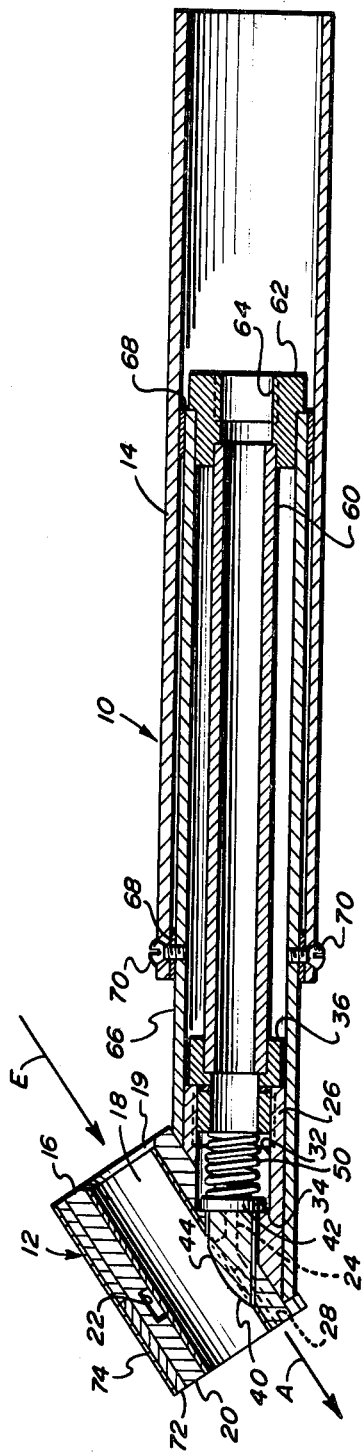
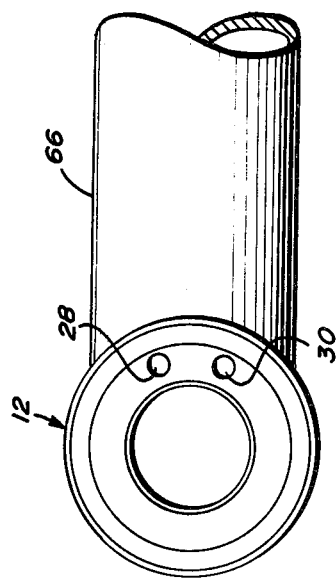

AIR-CARBON ARC CUTTING AND GOUGING TORCH

BACKGROUND OF THE INVENTION

1. Field of the Invention

This invention pertains to air-carbon arc cutting and gouging torches suitable for use in a metal foundry for cleaning riser pads, sprues, fins and other excess or unwanted surface material or defects from large metal castings. An air-carbon arc cutting and gouging torch operates by providing means to position a carbonaceous electrode (e.g. graphite) relative to a workpiece so that an electric arc can be struck and maintained between the electrode and the workpiece. As metal melts under the influence of the arc a stream of high pressure air directed along the electrode forcibly removes the molten metal from the influence of the arc. Thus, in the hands of a skilled operator unwanted metal or nonmetallic substances entrapped in the surface of a casting or metal object can be removed.

2. The Prior Art

The Air-Carbon Arc Cutting and Gouging method was first described in U.S. Pat. No. 2,706,236.

After the basic process was discovered a special torch for use in the foundry was developed and is disclosed in U.S. Pat. No. 2,726,309. The torch disclosed in the '309 patent is of the fixed-head design suitable for positioning large diameter electrodes in relation to a workpiece. Air flow through the torch to ports on either side of the electrode is controlled through a spring loaded valve which is opened by insertion of the electrode. The valve element includes a hemispherical end for contacting the electrode. As is common with all air-carbon arc cutting and gouging torches air and electric current are brought to the torch by means of a coaxial cable, comprising an inner cable carrying electrical energy and an outer insulating coating (e.g. rubber) with a space between the inner cable and outer cable to carry air under pressure. In the torch of the '309 patent current is carried through the valve plunger to the electrode. A torch according to the '309 patent required air having a source pressure of at least 80 psi and preferably 100 psi in order to operate efficiently. In view of the large diameter electrode used for cleaning heavy castings, large current was required to operate the process efficiently. Because of large current densities the torch frequently overheated thus causing operator fatigue and loss of process efficency because of frequent work stopages to allow the torch to cool.

SUMMARY OF THE INVENTION

In order to provide a more efficient fixed-head Air-Carbon Arc Cutting and Gouging Torch it was discovered that providing the torch head with a chamber so that the air could equalize in pressure around the electrode before beginning its aerial path outside of the torch head and positioning the exit passages in an angular relationship to the torch body, a more efficient torch capable of operating at reduced air pressure was achieved. Reducing the operating air pressure tends to reduce the operating noise level of the process thus increasing worker comfort. In addition, it was discovered that by creating an extended contact surface for the valve plunger current carrying efficiency was also increased. A redesign of the torch handle coupled with the new process air flow pattern, shortening of the valve stem, and decrease of the number of internal parts has lead to a torch that operates at lower temperature, tends to overheat less, and thus, increases operator comfort and overall process efficiency. Lastly, fixing the torch head at a maximum angle of 35° to the torch body promotes optimum process efficiency by positioning the electrode to the workpiece at the preferred angle when the torch is being used.

Therefore, it is the primary object of the present invention to provide an improved fixed-head air-carbon arc cutting and gouging torch.

It is another object of the present invention to provide a fixed-head air-carbon arc cutting and gouging torch suitable for use in the metal foundry for heavy duty metal cleaning operations.

It is still another object of the present invention to provide a fixed-head air-carbon arc cutting and gouging torch having improved air flow through the torch.

It is yet another object of the prevent invention to provide a fixed-head air-carbon arc cutting and gouging torch having improved air valve means.

It is a still further object of the present invention to provide a cooler operating fixed-head air-carbon arc cutting and gouging torch.

BRIEF DESCRIPTION OF THE DRAWING

FIG. 1 is the longitudinal section through a torch according to the present invention.

FIG. 2 is a bottom plan view of the torch of the present invention with a portion of the handle broken away for clarity of illustration.

DESCRIPTION OF THE PREFERRED EMBODIMENT

Referring to FIG. 1, the fixed-head air-carbon arc cutting and gouging torch 10 includes a head assembly 12 and a handle 14. The head assembly 12 includes a first generally cylindrical head portion 16 having a vertical bore 18 adapted to receive a graphite electrode such as commonly used in the air-carbon arc cutting and gouging process. Such electrodes are disclosed in U.S. Pat. No. 3,131,290. Intermediate electrode insertion and 16 and electrode projection end 20 of head 16 is a circumferential passage 22 surrounding bore 18 of head 16. Passage 22 does not open into the bore 18 of head 16 and can be closed by an insert sleeve 19 or other means well known to a worker skilled in the art. Circumferential passage 22 communicates with an air passage 24 in handle adapter 26 of head assembly 12. Air passage 24 communicates with air passages 28, 30 which extend with a longitudinal axis parallel to the longitudinal axis of bore 18 and open onto surface (end) 20 of torch head 16.

Handle adapter 26 includes a longitudinal bore or major air passage 32 terminating on the end adjacent torch head assembly 12 in a valve seat 34. On the other end air passage 32 is closed by a current tube adapter 36. Disposed within the air passage 32 is a plunger valve element 40 adapted to slidably project into bore 18 through a suitable opening in sleeve or liner 19 having a valve closure element 42 and a contact surface 44. Contact surface 44 is extended by utilizing a truncated cylinder or a curved surface to facilitate entry of the electrode into bore 18. The extended surface 44 of valve element 40 provides a better contact with the electrode (not shown) to thus increase the current carrying efficiency of the torch by causing better contact of the electrode with current carrying portions of head 16, lower resistance and provide for cooler operation of the torch.

Valve element 40 is normally biased to a closed position by means of spring 50 positioned between valve element 40 and current tube adapter 36.

Current tube adapter 36 has affixed thereto an elongated current tube 60 terminating in a cable adapter 62. Cable adapter 62 can contain an internal threaded surface 64 to receive a convention air-carbon arc cutting and gouging torch coaxial cable (not shown) such as disclosed in U.S. Pat. No. 3,234,317. The coaxial cable comprises a braided conductor (e.g. copper wire) having a threaded fitting or pressure fitting adapted to mate in surface 64 covered by a concentric insulating tube (e.g. rubber) for carrying air between the conductor and the covering. The braided conductor fitting (not shown) mating with current tube 60 usually includes a series of apertures so that air can pass through the fitting into adapter 62 through tube 60 into current tube adapter 36 past the valve element 40 and into the torch passages 22, 28 and 30. A current tube insulator 66 covers that portion of the torch head assembly including current tube adapter 36 and extends rearwardly and terminates at the cable assembly adapter 62. A larger diameter insulator in the form of handle 14 is placed over current tube insulator 62 and spaced therefrom by a plurality of spacers 68 which may be in the form of insulating rings. Handle 14 is fixed to current tube insulator 66 by oval head screws 70. Handle 14 extends rearwardly a sufficient distance so that it covers cable adapter 62 to prevent the operator from touching any current carrying portions of the torch.

Lastly, head assembly 12 can be covered with an outer insulating coating 72 to thus prevent an inadvertent contact of the current carrying portions of the torch with the metal workpiece of any surrounding object.

In operation of the torch the combined current and air cable is attached by means of cable adapter 62. An electrode designated by arrow E is inserted into the bore 18 of torch head 16 in the direction shown by the arrow. As the electrode is forced into the bore valve plunger 14 is caused to move to the right thus unseating valve element 42. When the current and the air are turned on current flows from adapter 62 through current tube 60 through current tube adapter 36, handle adapter 26, head 16, spring 50, and valve closure element 40 to the electrode E. Air passes through the coaxial cable assembly through cable adapter 62 the interior of current tube 60 adapter 36 past valve seat 34 through passage 24 and simultaneously into groove 22 and outwardly though passages 28 and 30 in the direction of arrow A. The groove 22 acts as a plenum chamber to equalize air pressure and thus minimize turbulance of the air exiting through passages 28 and 30. Less turbulent air flow causes more uniformity of the arc and greater process efficiency. In view of the fact that the valve element is shortened over that of U.S. Pat. No. 2,726,309 there is more air space in the torch thus providing for greater cooling of the torch by the air flowing in the torch. This enables the deletion of the shield which was necessary in the torch of the '309 patent.

The improved air flow permits the source air pressure to be decreased from 100 psi to 60 psi thus reducing the overall operating noise level of the process as the torch 10 is in use.

A torch according to the drawing was constructed and operated in a comparative test with a fixed head foundry torch sold by the Arcair Company of Lancaster, Ohio as a Model M-6 and one that is representative of a prior art torch.

The test procedure involved the following steps:
1. The New Foundry Torch was checked for air consumption on the rotometer, a standard M-6 Foundry Torch was also tested.
2. Five ¾" jointed electrodes were weighed and the lengths measured for use with the New Foundry Torch. A second set of five ¾" electrodes were prepared for use with the M-6 Torch.
3. Two pads were weighed for pad washing use with the two torches.
4. Each torch was used with five electrodes on pad washing. The amperage was recorded on the Heath Company Strip Chart. The arctime and noise level were noted for each torch.
5. The temperature of the jaws of each torch was measured immediately after gouging was completed.
6. The pads and electrodes were reweighed and the metal removal computed for each torch.

The results are set forth on Table 1.

TABLE I

| Torch | Amps | Volts | Lbs. Per Gram | Lbs. Per Inch | Lbs. Per Minute | Jaw Temp. |
|---|---|---|---|---|---|---|
| M-6 | 1600 | 40 | .0641 | .9562 | 3.3019 | 390° F. (199° C.) |
| Foundry Torch Model J2 | 1600 | 40 | .0748 | 1.0919 | 3.6619 | 380° F. (193° C.) |

Referring to Table I shows that the Foundry Torch according to the invention (EN7046) shows improved metal removal. While the jaw temperature for the torch according to the invention (measured by an optical pyrometer) was only 10° F. (6° C.), the operator had to stop using the M-6 torch before the pad washing was complete because the torch handle overheated. Actual handle temperature could not be read with an optical pyrometer because the handle material is insulating in nature. The torch according to the invention permitted about 20% more air by volume to flow through the torch than did the M-6 torch, resulting in more metal removal and cooler operating temperatures.

In constructing a torch according to the present invention it was found that fixing the head 16 at a maximum angle of 35° to the center line of the torch handle 14 provided maximum operator efficiency by fixing the angle of the electrode toward the workpiece when the torch is being operated.

Having thus described our invention, what is desired to be secured by Letters Patent of the United States is set forth in the appended claims.

What we claim is:
1. In a fixed head air-carbon arc cutting and gouging torch having an elongated torch body one end of which receives an electrical cable and an air conduit and the other end has a fixed torch head of the type wherein insertion of an electrode into the torch head is the operative means to move a valve plunger to unseat an air valve to admit air to the torch head for direction along an aerial path defined by the electrode toward the end of said electrode used to produce an arc with a workpiece, the improvement comprising:
    said torch head containing a longitudinal bore to receive and position said electrode relative to said torch body at an angle less than 90°, said bore including a circumferential passage transverse to the longitudinal axis of said bore intermediate the ends of said bore and adapted to be closed by means preventing air passing around an electrode inserted in said head;

an inlet air passage in said head adapted for admitting air to said circumferential passage and for controlling air flow by said plunger valve;

a pair of outlet air passages having longitudinal axis parallel to the longitudinal axis of said bore and said outlet passages extending from said circumferential passage to and opening on a surface of said head adjacent said bore for directing air parallel to said electrode in a direction toward the end of said electrode used to produce the arc each of said passages positioned so that the opening lies on the surface of the head between said bore and said torch body and at an angle no greater than 35° to the centerline of the torch body fixed to the torch head.

2. An air-carbon arc cutting and gouging torch according to claim 1 wherein said circumferential passage is cylindrical in shape.

3. An air-carbon arc cutting and gouging torch according to claim 1 wherein said valve plunger assembly is contained within said torch head.

4. An air-carbon arc cutting and gouging torch according to claim 1 wherein said valve plunger has an extended surface for contacting said electrode.

5. An air-carbon arc cutting and gouging torch according to claim 4 wherein said extended surface is curved.

6. An air-carbon arc cutting and gouging torch according to claim 1 wherein said head is fixed to said body at an angle no greater than 35° between the center line of said body and the center line of the bore of said head.

* * * * *